(No Model.)  3 Sheets—Sheet 1.
J. BACHELDER.
FRUIT DRIER.
No. 308,047. Patented Nov. 18, 1884.
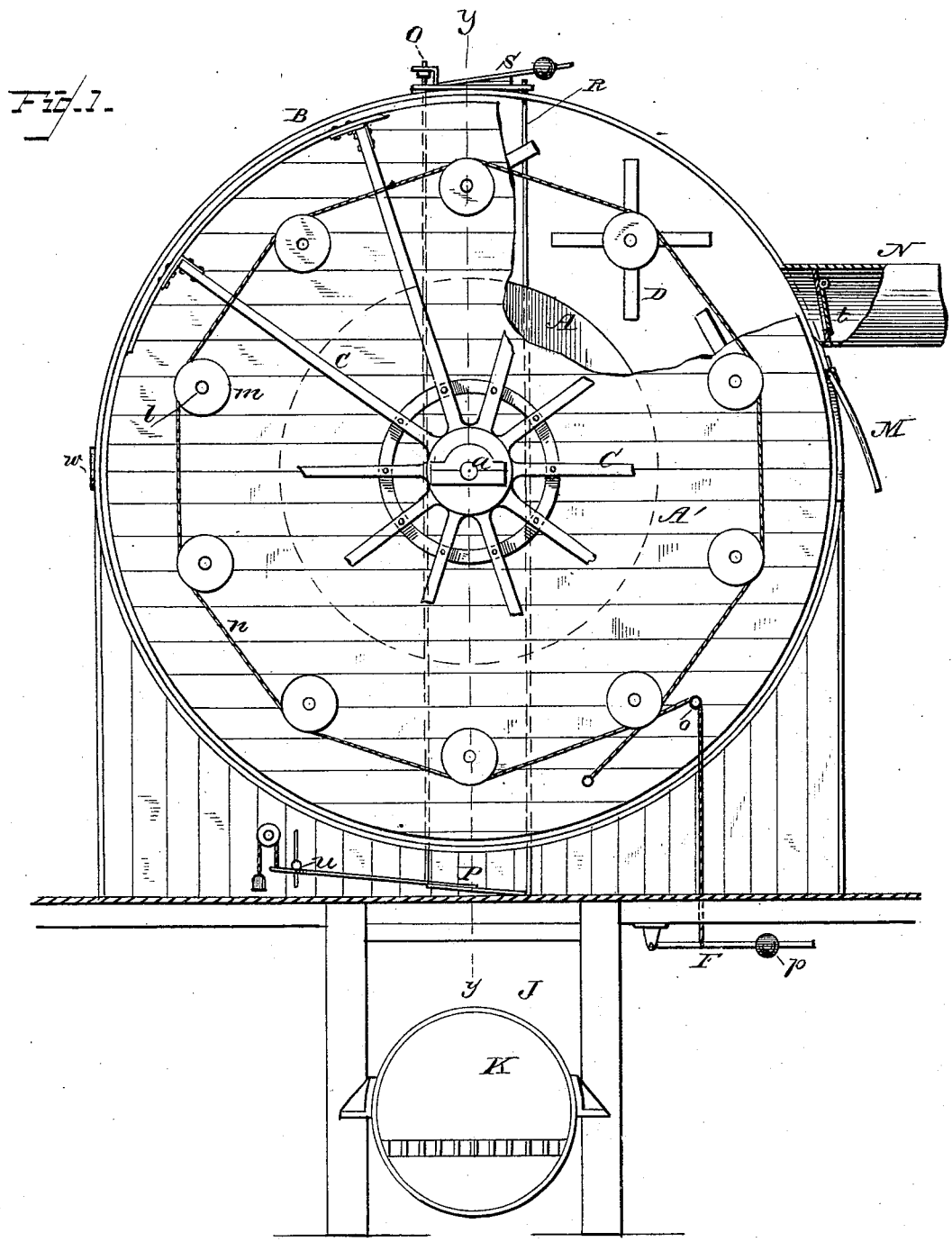
WITNESSES
F. L. Ourand
N. E. Oliphant
INVENTOR
John Bachelder
per Chas H Fowler
Attorney (No Model.) 3 Sheets—Sheet 2.
J. BACHELDER.
FRUIT DRIER.
No. 308,047. Patented Nov. 18, 1884.
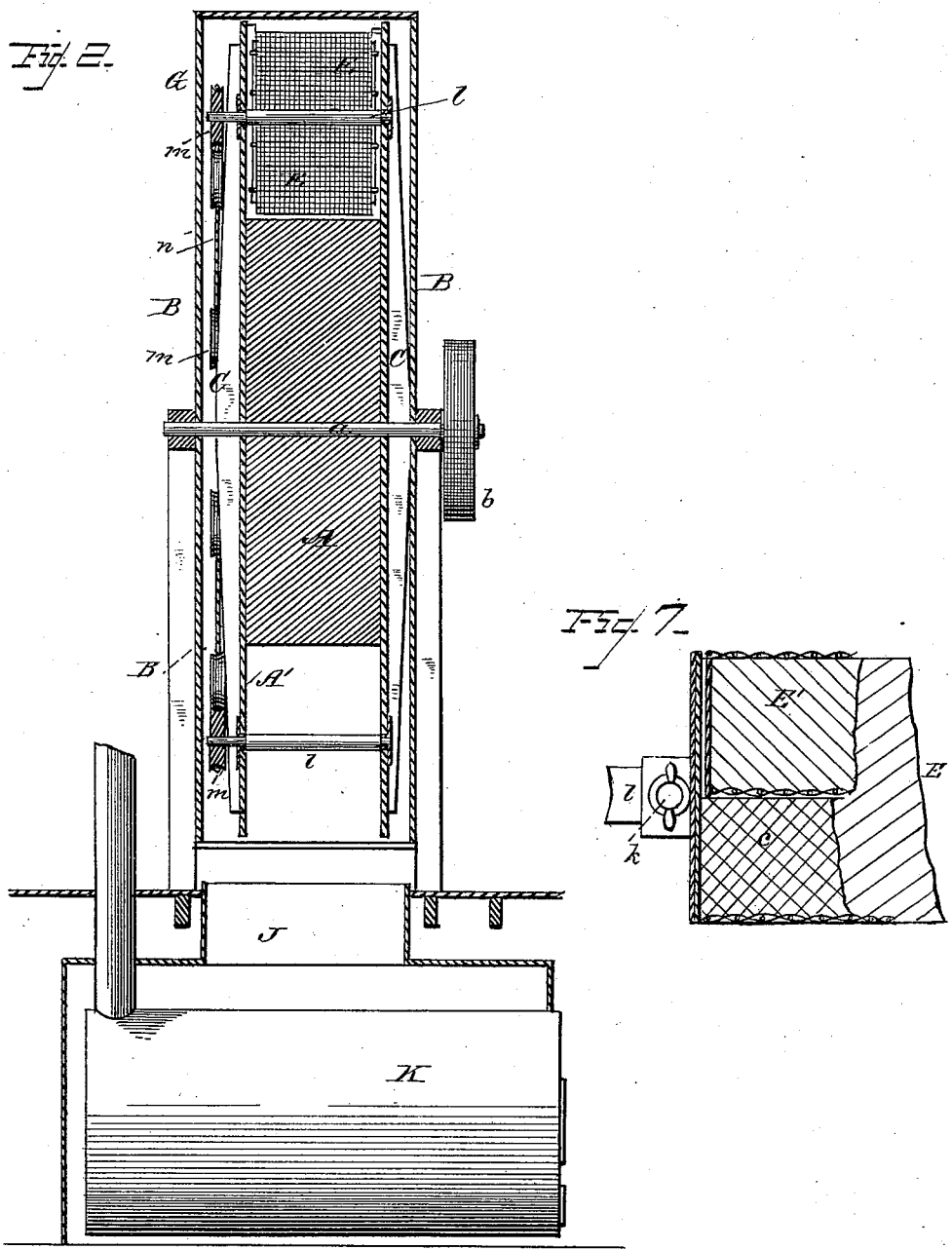
WITNESSES
F. L. Ouraud
N. E. Oliphant
INVENTOR
John Bachelder
per Chas. H. Fowler
Attorney

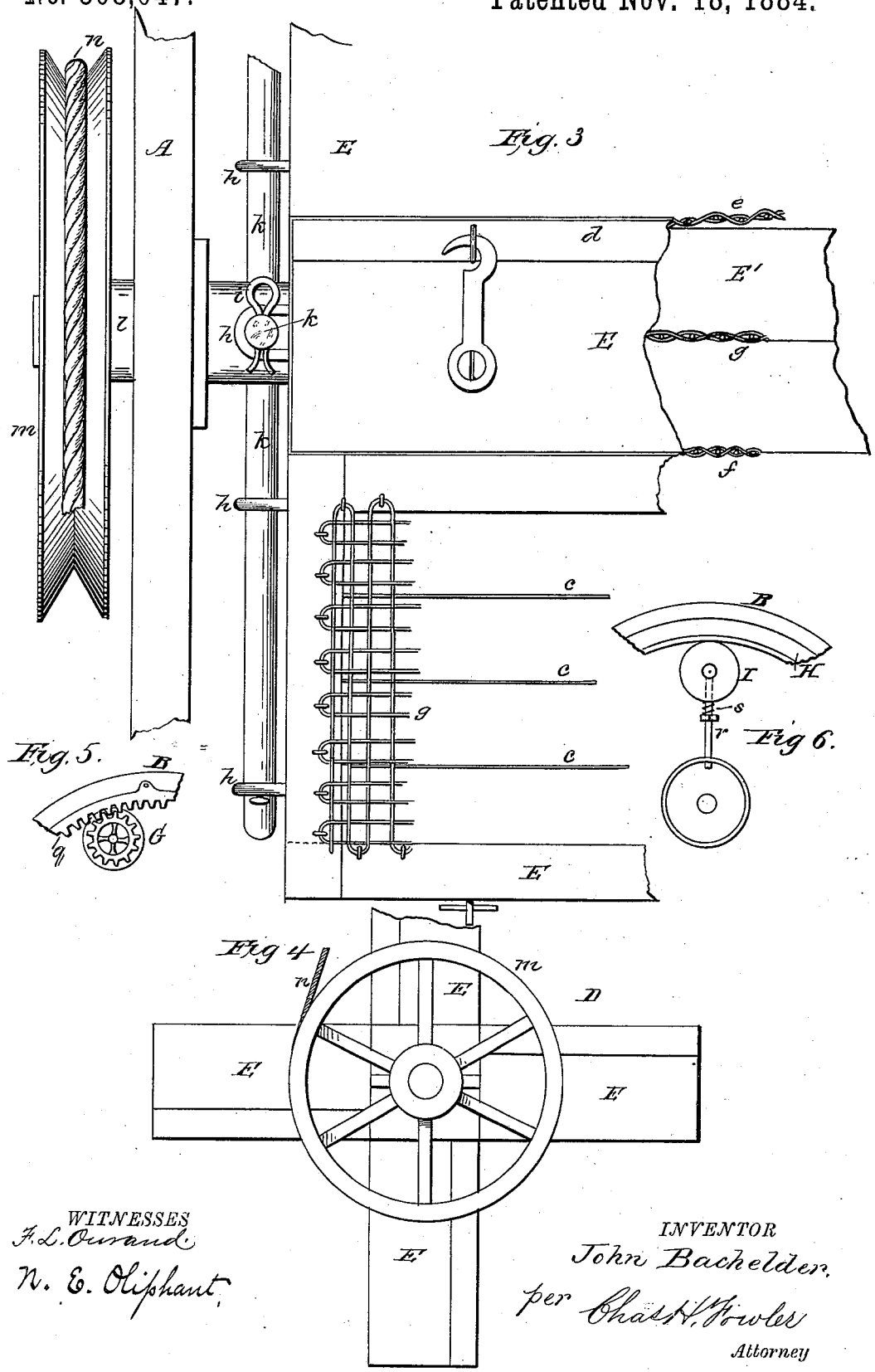

UNITED STATES PATENT OFFICE.

JOHN BACHELDER, OF NAPA, CALIFORNIA.

FRUIT-DRIER.

SPECIFICATION forming part of Letters Patent No. 308,047, dated November 18, 1884.

Application filed July 26, 1883. (No model.)

*To all whom it may concern:*

Be it known that I, JOHN BACHELDER, a citizen of the United States, residing at Napa, in the county of Napa and State of California, have invented certain new and useful Improvements in Fruit-Driers; and I do hereby declare that the following is a full, clear, and exact description of the same, reference being had to the annexed drawings, making a part of this specification, and to the letters and figures of reference marked thereon.

Figure 1 of the drawings is a side elevation of a fruit-drier constructed in accordance with my invention, with the side of the casing removed and a portion of the drum broken away to show one of the tray-carriages; Fig. 2, a sectional view of the fruit-drier, taken on line $y\ y$ of Fig. 1, showing the furnace in elevation; Fig. 3, a detail view on an enlarged scale, showing the construction of the tray-carriage and the manner of connecting it to its shaft; Fig. 4, a side view in detail of one of the tray-carriages; and Figs. 5 and 6, detail views showing modifications of the means employed to rotate the trays independent of the rotary motion of the drum. Fig. 7 is a detail view of a portion of one of the tray-carriages and trays.

The present invention has relation to certain new and useful improvements in rotary fruit-driers, and the object thereof is to provide means whereby the fruit-trays will have a continuous independent rotary motion upon their own axis throughout the entire revolution of the drum as they are being carried around in the line of a circle; or, in other words, giving to the trays a compound motion, similar to what is termed the "sun-and-planet system," thereby rendering the process of evaporation more effective. A further object is to improve the machine in the several details of construction, whereby the surface of the fruit or other articles to be evaporated of their moisture are more thoroughly and equally exposed, and consequently more perfectly dried, and obtaining a better circulation of heated air, thus producing greater uniformity in the product. These several objects I attain by the construction substantially as shown in the drawings, and hereinafter described and claimed.

In the accompanying drawings, A represents a suitable drum revolving within a stationary casing, B, said drum being mounted upon a horizontal shaft, $a$, which has upon one end a belt-pulley, $b$, for operating the shaft to give to the drum a rotary motion. The drum A is provided with flanges or extensions A', which form the walls of the hot-air channel, and when referring to said drum hereinafter the construction thereof, as above stated, should be understood. This shaft $a$ passes through the sides of the casing B, and has its bearings in suitable boxes, said shaft having connected thereto radial arms C, which support the drum-heads and walls of the tray-channel.

The construction of the fruit-tray carriages D is more clearly shown in Figs. 3 and 4. The outside trays, E, have wire-cloth bottoms, $f$, and are divided into a series of compartments for fruit by longitudinal partitions $c$, which extend half-way from bottom to top of tray, the object being to keep the fruit from massing when the tray-carriage revolves. The inside tray, E', fitted to go into inside of the tray E, rests on the top of the longitudinal partitions in said outside tray, and has also a wire-cloth bottom, $g$, which, when the tray is in position, serves as a cover to the fruit in the bottom of the outside tray. The outside tray has a framed wire-cloth cover, $d\ e$, that covers and holds the inside tray, E', in position, and is hinged at one edge and provided with proper fastenings on the other. The trays E and E' are arranged as shown in Fig. 3, and are connected by loops or staples $h$, and suitable keys, $i$, to radial arms $k$, by which means they are supported. These arms $k$ extend radially from a shaft, $l$, which has its bearings in the sides or heads of the drum A, a sheave or grooved pulley, $m$, being set on the shaft of the tray-carriage, by which said shafts are revolved, to give to the tray-carriages a rotary motion independent of the motion of the drum. This motion of the shaft is obtained by frictional contact of a stationary cord, $n$, bearing in the grooves of the sheaves or pulleys $m$, one end of the cord being secured to the side of the casing A, near the bottom thereof, and then extending up and around the pulleys and over a small sheave, o, connected to the casing, after which it is secured to a pivoted lever, F, located below the floor, or in any other convenient position. Upon this lever is placed an adjustable weight, p, which is set at a point thereon necessary to give the required friction to rotate the tray-carriages, and also movable on the lever to regulate the friction.

The above-described means is only one in many that may be employed to give to the trays or tray-carriages the required motion independent of the motion of the revolving drum, as my invention in this particular is susceptible of various modifications, one of which I have shown in Figs. 5 and 6.

In Fig. 5 a pinion, G, is employed, which is mounted on the tray-carriage shaft and meshes with the teeth of an internal gear, q, permanently secured to the inside of casing B, or a flanged ring, H, may be substituted in place of the internal gear, as shown in Fig. 6, the inside surface being flat and smooth, and against which bears a friction-roller, I. This friction-roller is supported in bearings loosely fitted with a socket sliding on the end of a rod, r, a spiral spring, s, keeping the friction-roller pressed and held against the inside of the flange-ring. Thus, as the drum is rotated, the tray-carriage shaft, upon which the friction-roller is secured, will be caused to rotate and carry with it the trays. These tray-carriages may be constructed of any suitable material, and in width and depth are made to correspond with the channel in which they revolve. Hot air is admitted to this channel occupied by the trays from the hot-air chamber J, arranged above a suitable furnace, K, the hot air being carried forward to any point where it is convenient or desirable to discharge it. The drum A, with its system of tray-carriages, is made to revolve by a belt, cord, or chain and pulley, though I do not desire to confine myself to any special means of imparting to the drum a rotary motion, as it is evident that any well-known mechanism may be substituted without departing from the principle of the invention.

The casing B is provided with a suitable door, M, through which the trays are put in and removed, said door having a glass window to enable the attendant to examine the fruit without opening the door. The casing may be also provided with a thermometer, w, to indicate the degree of heat therein, and an escape-valve, t, is located inside the discharge-pipe N, for the air to escape, as the air is carried along by the motion of the drum and tray-carriages after it has taken up the moisture. A metallic rod, O, has its lower end jointed to a hot-air valve or damper, P, and extends above the upper end of the casing B, where it is provided with a nut or collar for adjustment, so that when the heat is excessive the rod will expand, and by so doing close the damper. This damper is weighted, and an adjustable stud, u, is secured to it for regulating the extent of its opening.

Parallel with the rod O is a metallic rod, R, the lower end thereof resting upon a firm basis, and when the heat is above the proper degree the expansion of the rod raises an escape-valve, S, at the top, and allows a portion of the hot air in the tray-channel to escape.

The bearings for the shafts of the revolving tray-carriages may be made of metal lubricated with powdered graphite.

I am aware that means for drying glue have been employed, which consist of a series of independently-rotating metal disks carried around by a revolving wheel to bring said disks in contact with a trough of liquid glue, so that it will adhere to its sides, and as it dries and becomes hard will crack and drop off.

I do not desire to be understood as claiming such construction of devices; but

What I do claim as new, and desire to secure by Letters Patent, is—

1. In a fruit-drier, the combination, with a rotary drum, of a series of fruit-trays or fruit-tray carriages, and means, substantially as described, whereby the trays or carriages will have imparted to them a continuous independent rotary motion as they are being carried around by the drum throughout its entire revolution, substantially as and for the purpose set forth.

2. In a fruit-drier, the combination, with a rotary drum, of a series of tray-carriages mounted upon suitable shafts provided with pulleys, and a cord passing around or over the same and connected to a weighted lever, substantially as and for the purpose specified.

3. In a fruit-drier, the combination, with a rotary drum mounted upon a horizontal shaft provided at its ends, upon the exterior of said drum, with a series of radial arms, of a series of trays or tray-carriages journaled in the sides or flanges of the drum, and adapted to have a motion, independent of the motion of said drum, continuous throughout the entire revolution thereof, substantially as and for the purpose set forth.

4. A fruit-drier provided with a casing having an inlet and discharge for the heated air, and containing a rotary drum carrying a series of independently-rotating trays or tray-carriages, the latter rotating in opposite directions to that of the drum, whereby the heated air is circulated and discharged, substantially as and for the purpose specified.

5. A fruit-drier provided with a casing having an inlet and discharge for the heated air, a drum adapted to rotate within the same, and having circumferential flanges or extensions to form the walls of the hot-air channel, said flanges or extensions having located between them a series of independently-rotating trays or tray-carriages, substantially as and for the purpose described.

6. A tray-carriage for rotary fruit-driers, consisting of four radially-arranged outer trays provided with wire-cloth bottoms, and divided into a series of compartments, for the reception of removable inner trays, by longitudinal partitions extending half-way from the bottom to top of said outer trays, substantially as and for the purpose specified.

In testimony that I claim the above I have hereunto subscribed my name in the presence of two witnesses.

JOHN BACHELDER.

Witnesses:
A. J. HULL,
ROB. CROUCH.